United States Patent
Koida et al.

(10) Patent No.: US 10,266,976 B2
(45) Date of Patent: Apr. 23, 2019

(54) NONWOVEN FABRIC FOR REINFORCING FOAM MOLDED ARTICLES AND PRODUCT USING SAME

(71) Applicant: Toyobo Co., Ltd., Osaka (JP)

(72) Inventors: Takashi Koida, Osaka (JP); Shinichiro Inatomi, Osaka (JP)

(73) Assignee: TOYOBO CO., LTD., Osaka (JP)

( * ) Notice: Subject to any disclaimer, the term of this patent is extended or adjusted under 35 U.S.C. 154(b) by 243 days.

(21) Appl. No.: 14/405,350

(22) PCT Filed: May 30, 2013

(86) PCT No.: PCT/JP2013/064991
§ 371 (c)(1),
(2) Date: Dec. 3, 2014

(87) PCT Pub. No.: WO2013/183529
PCT Pub. Date: Dec. 12, 2013

(65) Prior Publication Data
US 2015/0132559 A1    May 14, 2015

(30) Foreign Application Priority Data

Jun. 4, 2012  (JP) ................. 2012-127510
Jun. 4, 2012  (JP) ................. 2012-127511

(51) Int. Cl.
| | |
|---|---|
| *D04H 3/011* | (2012.01) |
| *D04H 3/02* | (2006.01) |
| *B32B 5/26* | (2006.01) |
| *D04H 3/14* | (2012.01) |
| *B32B 5/02* | (2006.01) |

(52) U.S. Cl.
CPC ............ *D04H 3/011* (2013.01); *B32B 5/022* (2013.01); *B32B 5/26* (2013.01); *D04H 3/02* (2013.01); *D04H 3/14* (2013.01); *B32B 2262/0276* (2013.01); *B32B 2262/0284* (2013.01); *D10B 2331/04* (2013.01); *Y10T 428/24992* (2015.01)

(58) Field of Classification Search
None
See application file for complete search history.

(56) References Cited

U.S. PATENT DOCUMENTS

| | | |
|---|---|---|
| 7,790,643 B2 | 9/2010 | Kanda et al. |
| 2009/0247037 A1 | 10/2009 | Kanda et al. |

FOREIGN PATENT DOCUMENTS

| | | | |
|---|---|---|---|
| JP | 06-171002 | | 6/1994 |
| JP | 2004-353153 | | 12/2004 |
| JP | 2004353153 A | * | 12/2004 |
| JP | 2007146356 A | * | 6/2007 |
| JP | 2007197891 A | * | 8/2007 |
| JP | 2007-197891 | | 9/2007 |
| JP | 2007-331259 | | 12/2007 |
| JP | 2011-104947 | | 6/2011 |
| JP | 2011-168923 | | 9/2011 |
| JP | 2012-007259 | | 1/2012 |
| JP | 2012-007260 | | 1/2012 |
| JP | 2012007260 A | * | 1/2012 |
| WO | 2007-049627 | | 5/2007 |
| WO | 2012-173104 | | 12/2012 |

OTHER PUBLICATIONS

Japanese Patent Office, Office Action for Japanese Application No. 2012-127511, dated Sep. 1, 2015 (with English translation).
Japanese Patent Office, International Search Report for International Patent Application No. PCT/JP2013/064991 (dated Aug. 27, 2013).
Japanese Patent Office, Office Action for Japanese Application No. 2013-117687, dated Sep. 16, 2014 (with English translation).
USPTO Office Action dated Apr. 20, 2018 received for U.S. Appl. No. 15/812,126.

* cited by examiner

*Primary Examiner* — Marla D McConnell
*Assistant Examiner* — Kevin Worrell
(74) *Attorney, Agent, or Firm* — Fish & Richardson P.C.

(57) ABSTRACT

It is provided that a nonwoven fabric for reinforcing foam molded articles which is excellent in the dimensional stability in a cutting/sewing step, in the followability to a mold in a foam molding step, and gives a foam molded article with excellent appearance and durability. A nonwoven fabric for reinforcing foam molded articles formed by interlacing at least 2 filament nonwoven fabric layers with different apparent density, wherein the nonwoven fabric has base weight of 50-110 g/m², thickness of 0.5-1.2 mm, 23 to 50 N/5 cm stress at the time of 5% elongation in longitudinal direction, 15 N/5 cm or lower stress at the time of 5% elongation in transverse direction, and air permeability of 50 to 250 cm³/cm²·sec.

8 Claims, No Drawings

NONWOVEN FABRIC FOR REINFORCING FOAM MOLDED ARTICLES AND PRODUCT USING SAME

TECHNICAL FIELD

The present invention relates to a nonwoven fabric for reinforcing foam molded articles, and particularly to a nonwoven fabric for reinforcing foam molded articles which is suitable for reinforcing seat pads to be used for vehicular seat materials and to products using the nonwoven fabric.

BACKGROUND ART

As a vehicular seat material, a molded article of a foamed resin (hereinafter, referred to as foam molded article) united with a nonwoven fabric for reinforcement at the time of molding is used. This nonwoven fabric for reinforcing a foam molded article (hereinafter, referred to as nonwoven fabric for reinforcement) is arranged between a foamed resin and metal springs to exhibit functions of making the cushion action of the metal springs evenly and at the same time preventing the frictional sound generated by contact of the metal springs and the foam molded article.

For example, Patent Document 1 describes a nonwoven fabric for reinforcement obtained by layering filament nonwoven fabric layers with different porosity, that is, layering a bulky layer and a dense layer. This nonwoven fabric for reinforcement is for preventing bleeding of a foamable resin by the dense layer at the time of molding a foam molded article.

In recent years, as consumers request increasingly higher quality, a deeply drawing type foam molded article with high design properties has been required more. However, when the nonwoven fabric for reinforcement described in Patent Document 1 is used for a deeply drawing type foam molded article, since the nonwoven fabric for reinforcement is inferior in the followability to a mold, there occurs a problem that a tear is caused locally attributed to wrinkles and blisters and a foamable resin bleeds out through the tear to the surface of the bulky layer of the nonwoven fabric for reinforcement.

To avoid such a problem, Patent Document 2 describes a foam molded body reinforcing material composed of a dense layer and a base layer and having stress of 0.5 to 20 N/5 cm at the time of 5% elongation at 65° C. Although having good followability to a mold in the foam molding step, the foam molded body-reinforcing material described in Patent Document 2 has a problem that a foamable resin sometimes bleeds out to the surface of the reinforcing material at the time of a foam molding step, depending on the type of the foamable resin and also that the dimensional stability of the foam molded body-reinforcing material is inferior in a cutting/sewing step.

Patent Document 3 describes a foamed urethane-reinforcing material with increased stress of 18 N/5 cm or higher at the time of 5% elongation. Although having good dimensional stability in the cutting/sewing step, the foamed urethane-reinforcing material described in Patent Document 3 has a problem of inferior followability to a deep drawing type mold.

Patent Document 4 describes a nonwoven fabric with apparent density of 0.06 to 0.15 g/cm$^3$ and dry heat shrinkage rate of −0.5 to 0.5% at 65° C. Although having good followability to a mold in the foam molding step, the nonwoven fabric described in Patent Document 3 has a problem of inferior durability of an obtained foam molded article.

PRIOR ART DOCUMENTS

Patent Documents

Patent Document 1: JP-A-hei-6-171002
Patent Document 2: JP-A-2004-353153
Patent Document 3: JP-A-2007-331259
Patent Document 4: JP-A-2012-007259

SUMMARY OF THE INVENTION

Problems to be Solved by the Invention

Nonwoven fabric for reinforcement is conventionally known which has basic properties; that is, causing no bleeding of a foamable resin in a foam molded article, showing a good finishing form, and being excellent in suppressing frictional sound, flexural sound, reflection sound, etc; and additionally a property excellent in followability to a mold at the time of foam molding.

However, in the step of cutting/sewing a nonwoven fabric for reinforcement in a form of a foam molded article, which is a step before foam molding a seat pad, at the time of a cutting work by drawing the rolled nonwoven fabric for reinforcement, if the nonwoven fabric for reinforcement is provided with excess flexibility to satisfy the followability to a mold for foam molding, the nonwoven fabric for reinforcement is deformed due to the processing tension at the time of drawing and it results in a problem of decrease of workability.

Accordingly, the present invention aims to provide a nonwoven fabric for reinforcement excellent in the followability to a mold at the time of foam molding and suppressed from deformation attributed to the processing tension in a cutting/sewing step. Further, the present invention aims to provide a nonwoven fabric for reinforcement causing no bleeding of a foamable resin at the time of foam molding, giving a good finishing form of a foam molded article, and excellent in functions of suppressing frictional sound, flexural sound, reflection sound, etc.

Solutions to the Problems

The inventors of the present invention made various investigation to achieve the aim and found that a nonwoven fabric for reinforcement (hereinafter, referred to as a first nonwoven fabric for reinforcement) formed by interlacing at least 2 filament nonwoven fabric layers with different apparent density and having base weight of 50-110 g/m$^2$, thickness of 0.5-1.2 mm, 23 to 50 N/5 cm stress at the time of 5% elongation in longitudinal direction, 15 N/5 cm or lower stress at the time of 5% elongation in transverse direction, and air permeability of 50 to 250 cm$^3$/cm$^2$·sec is excellent in the dimensional stability in a cutting/sewing step, in the followability to a mold in a foam molding step, and gives a foam molded article with excellent appearance and durability.

In the first nonwoven fabrics for reinforcement, it is preferable that the fiber arrangement angle of the filament nonwoven fabric with the highest apparent density is 5 to 60°.

The inventors of the present invention found that a nonwoven fabric for reinforcement (hereinafter, referred to as a second nonwoven fabric for reinforcement) formed by interlacing at least 2 filament nonwoven fabric layers with different apparent density, wherein all of the nonwoven fabric layers have apparent density of higher than 0.15 g/cm³, and the nonwoven fabric has dry heat shrinkage rate of −1 to 2% in both longitudinal and transverse directions at the time of heat treatment at 80° C. for 30 minutes and tear strength of 20 N or higher in both longitudinal and transverse directions is excellent in the dimensional stability in a cutting/sewing step, in the followability to a mold in a foam molding step, and gives a foam molded article with excellent appearance and durability.

In the second nonwoven fabrics for reinforcement, it is preferable that the stress at the time of 5% elongation in longitudinal direction is 20 to 45 N/5 cm and the stress at the time of 5% elongation in transverse direction is 19 N/5 cm or lower.

In the first and the second nonwoven fabrics for reinforcement, it is preferable that the filament nonwoven fabrics are made of polyester fibers.

Furthermore, the present invention includes a foam molded article wherein the first and the second nonwoven fabrics for reinforcing foam molded articles is used as a reinforcing cloth, and a foam molded article wherein the filament nonwoven fabric with higher apparent density between 2 layers of filament nonwoven fabric with different density is arranged in the foamed body side of the foam molded article.

Effects of the Invention

In the case of using either one of the first and the second nonwoven fabrics for reinforcement of the present invention (hereinafter, in the case of referring simply to a nonwoven fabric for reinforcement, it means both of the first and the second nonwoven fabrics for reinforcement), no bleeding of a foamable resin is caused in a foam molded article and the foam molded article is excellent in a sound suppressing property for frictional sound generated due to friction between the foam molded article and metal springs of a seat. Further, the nonwoven fabric for reinforcement of the present invention is provided with flexibility, excellent in the followability to a mold at the time of foam molding, and has improved workability at the time of drawing the nonwoven fabric for reinforcement in a cutting/sewing step. Since being relatively lightweight, the nonwoven fabric for reinforcement of the present invention is useful for economically producing a lightweight and high grade foam molded article and contributes to making a vehicle using the foam molded article economical and lightweight and also to saving energy in terms of driving the vehicle.

MODE FOR CARRYING OUT THE INVENTION

A nonwoven fabric for reinforcement of the present invention is a nonwoven fabric obtained by interlacing at least 2 filament nonwoven fabric layers with different apparent density. That is, the nonwoven fabric for reinforcement of the present invention contains a layer of a nonwoven fabric with higher apparent density (hereinafter, referred to as dense layer) and a nonwoven fabric with lower apparent density (hereinafter referred to as bulky layer). The dense layer is a layer to bring into contact with a foamed body and is of a filament nonwoven fabric having a function of preventing bleeding of a foamable resin in a foam molding step, suppressing elongation of the nonwoven fabric in the fiber arrangement direction at the time of drawing work of the nonwoven fabric in the cutting step, and being so improved in the fiber arrangement as to give mechanical characteristics for improving the followability to a mold at the time of foam molding, and contributing to improvement of the dimensional stability in the cutting/sewing step. On the other hand, the bulky layer is a layer bringing into contact with metal springs of a seat and is of a filament nonwoven fabric contributing to suppression of frictional sound, flexural sound, reflection sound, etc., and providing a function of wear resistance and durability.

Use of such filament nonwoven fabrics makes it possible to cause even deformation in the foam molding step, so that tears are hardly formed, the appearance of a foam molded article becomes good, and at the same time, the durability can be improved. However, in the case of using short fiber nonwoven fabric, tears tend to be formed easily because of uneven deformation in the foam molding step. Still further, in the case a dense layer is a short fiber-nonwoven fabric layer, since there is no continuity of fibers, the mechanical characteristics with low base weight are inferior, and since the followability to a mold differs locally at the time of molding, deformation and breakage tend to be caused undesirably.

The dense layer and the bulky layer are interlaced and joined to give a nonwoven fabric for reinforcement with a structure in which the fibers composing the filament nonwoven fabric of the bulky layer are extruded to the surface of the dense layer (hereinafter, referred to extruded fiber structure). As a result, the nonwoven fabric for reinforcement is softened and provided with excellent followability to a mold, and at the time of foam molding, the entire body of the foam molded article is united owing to an anchor effect of the extruded fiber structure to give the foam molded article provided with improved durability, too. This nonwoven fabric for reinforcement can be remarkably improved in the handling property at the time of the nonwoven fabric-drawing work by increasing the elongation stress in a low elongation range and thus suppressing the elongation and moreover can be excellent in the moldability, sound suppression properties, and durability.

The base weight of the nonwoven fabric for reinforcement is 50 g/m² or higher and preferably 60 g/m² or higher. The base weight of the nonwoven fabric for reinforcement is 110 g/m² or lower and preferably 100 g/m² or lower. If the base weight is less than 50 g/m², a foamable resin may possibly bleed out in the foam molding step and since the tear propagation strength of the nonwoven fabric for reinforcement is lowered, the durability of the foam molded article may possibly be worsened. If the base weight exceeds 110 g/m², it may possibly result in failure to meet the need of lightweight of a vehicle.

Thickness of the nonwoven fabric for reinforcement is 0.5 to 1.2 mm and preferably 0.6 to 1.0 mm. If the thickness is less than 0.5 mm, the shutting function for a foamable resin is lowered to cause bleeding in some cases. If the thickness exceeds 1.2 mm, the followability to a mold is worsened at the time of foam molding, resulting in defective molding in some cases.

The nonwoven fabric for reinforcement of the first aspect of the present invention has stress of 23 to 50 N/5 cm at the time of 5% elongation in longitudinal direction and stress of 15 N/5 cm or lower at the time of 5% elongation in transverse direction. If the arrangement of fibers of the filament nonwoven fabric is made evenly in the longitudinal direction, the stress at the time of 5% elongation in the longitudinal direction becomes high and the stress at the time of 5% elongation in the transverse direction becomes low.

In order to prevent deformation of a nonwoven fabric due to drawing tension in the cutting step, improve the cutting property, and improve the followability to a mold at the time of foam molding, the stress of the nonwoven fabric for reinforcement at 5% elongation in the longitudinal direction is 23 to 50 N/5 cm and preferably 30 to 45 N/5 cm. If it is less than 23 N/5 cm, the nonwoven fabric is deformed due to the drawing tension in the cutting/sewing step and the workability is lowered and it consequently results in failure of stable cutting or setting the nonwoven fabric in a mold. If it exceeds 50 N/5 cm, the followability to a mold at the time of foam molding is lowered and it results in an inferior finishing form, tears, wrinkles, etc.

The nonwoven fabric for reinforcement of the first aspect of the present invention has stress of 15 N/5 cm or lower, preferably 5 to 14 N/5 cm, and more preferably 8 to 12 N/5 cm at the time of 5% elongation in transverse direction. If it exceeds 15 N/5 cm, the followability to a mold is worsened and consequently, the finishing form becomes worse in some cases. If it is less than 5 N/5 cm, when tension is applied in the transverse direction in the cutting/sewing step, the nonwoven fabric may possibly be elongated or deformed and the followability to a mold may be different in the longitudinal and transverse directions at the time of foam molding, so that finishing form of a molded article may possibly be worsened and the nonwoven fabric may be torn in some cases.

The nonwoven fabric for reinforcement of the second aspect of the present invention has preferably stress of 20 to 45 N/5 cm at the time of 5% elongation in longitudinal direction. The nonwoven fabric for reinforcement of the second aspect of the present invention has preferably stress of 19 N/5 cm or lower and more preferably 5 to 19 N/5 cm at the time of 5% elongation in transverse direction. If it is less than 5 N/5 cm, the processing defect may sometimes be caused even in the case where desired stress is applied at the time of 5% elongation in the longitudinal direction.

If the stress of the nonwoven fabric for reinforcement of the second aspect of the present invention at the time of 5% elongation in the longitudinal direction is less than 20 N/5 cm, the nonwoven fabric for reinforcement may sometimes be deformed due to the drawing tension in the cutting/sewing step and the cutting may become unstable. If the stress at the time of 5% elongation in the longitudinal direction exceeds 45 N/5 cm, wrinkles may possibly be formed in a foam molded article. If the stress at the time of 5% elongation in the transverse direction is less than 5 N/5 cm, when tension is applied in the transverse direction in the cutting/sewing step, the nonwoven fabric may possibly be elongated or deformed and the followability to a mold may be different in the longitudinal and transverse directions at the time of foam molding, so that the appearance of a foam molded article may possibly be worsened and the nonwoven fabric for reinforcement may be torn in some cases. If the stress at the time of 5% elongation in the transverse direction exceeds 19 N/5 cm, the followability to a mold is worsened and consequently, the finishing form becomes worse in some cases.

Long fibers to be used for the nonwoven fabric for reinforcement can be obtained by melt spinning and the nonwoven fabric for reinforcement can be produced by pulling long fibers obtained by melt spinning with an ejector and thereafter collecting the long fibers on a conveyor net. The spinning speed is preferably 3500 m/min or higher preferably 4000 m/min or higher. If the spinning speed is less than 3500 m/min, wrinkles tend to be formed at the time of thermal bonding of the filament nonwoven fabric by embossing rolls.

To keep the stress at the time of 5% elongation of the dense layer within the above-mentioned preferable range, the fiber arrangement is preferably tilted at 5 to 60° and more preferably 10 to 30° in the endless direction of the conveyor net (hereinafter, referred to as "endless direction"). The fiber arrangement angle is measured by measuring the arrangement angles for 100 fibers at arbitrary 5 points and averaging the measured angles to employ the average value as the fiber arrangement angle. In the case where all of fibers of the nonwoven fabric are arranged in the longitudinal direction (MD direction), the fiber arrangement angle becomes 0° and in the case where all of fibers of the nonwoven fabric are arranged in the transverse direction (TD direction), the fiber arrangement angle becomes 90°.

In the filament nonwoven fabric production step, in order to arrange the long fibers, which flow downstream together with a pulling fluid and accompanied current (hereinafter, referred to "following current") and which are drawn and hardened, slantingly at 10 to 30° to the endless direction, the following current on the pulling conveyor net surface in the width direction and the following current in the direction penetrating the conveyor net surface (hereinafter, referred to as "perpendicular direction") are suppressed and meanwhile the following current in the endless direction is increased slightly more. As a result, the fibers are arranged more in the endless direction. As a following current adjustment method, there are some ways: that is, installing baffles for the following current in the rim parts in the width direction of the conveyor net surface, lowering the suction blow speed of the following current in the perpendicular direction, etc. Consequently, the fiber arrangement angle can be adjusted. For example, if baffles for following current with some cm height are installed in the rim parts of the conveyor net in the width direction to control the suction blow speed to be 3.0 to 9.0 m/s, a filament nonwoven fabric with fiber arrangement angle of 20 to 28° can be obtained. Additionally, a punching metal, a wire gauze, or the like may be used as the baffles for following current.

The nonwoven fabric for reinforcement is composed of a dense layer and a bulky layer. The dense layer is preferable to be formed by arranging fibers more in the direction close to the longitudinal direction; that is the fiber arrangement angle is narrow. On the other hand, the fiber arrangement angle is not particularly limited in the case where the base weight of the nonwoven fabric for reinforcement is low, but in the case where the base weight of the nonwoven fabric for reinforcement is high, in order to keep the stress at the time of 5% elongation in the transverse direction of the nonwoven fabric for reinforcement not be too high, the filament nonwoven fabric is preferable to have a bulky layer with a narrow fiber arrangement angle similarly to that of the dense layer. It is because if the base weight of the nonwoven fabric for reinforcement is high, the base weight of the bulky layer is often high, too, and in such a case, if the filament nonwoven fabric in which the fibers are arranged more in the longitudinal direction is not used as the bulky layer, it becomes difficult to keep the stress at the time of 5% elongation in the transverse direction of the nonwoven fabric for reinforcement to be obtained below the prescribed stress.

In the nonwoven fabric for reinforcement of the present invention, the ratio of the stress at the time of 5% elongation in the longitudinal direction and the stress at the time of 5% elongation in the transverse direction (stress at the time of 5% elongation in the longitudinal direction÷# stress at the time of 5% elongation in the transverse direction) is preferably 2.2 or higher, more preferably 3 to 14, and even more preferably 4 to 7. If the ratio of the stress at the time of 5% elongation in the longitudinal direction and the stress at the time of 5% elongation in the transverse direction is lower than 2.2, the fiber arrangement may become a random structure and the stress at the time of 5% elongation in the longitudinal direction becomes low and the dimensional stability in the cutting/sewing step may be inferior in some cases. If the ratio of the stress at the time of 5% elongation in the longitudinal direction and the stress at the time of 5% elongation in the transverse direction exceeds 14, the fiber arrangement may become too linear and the stress at the time of 5% elongation in the transverse direction becomes low and the transverse elongation may be caused easily with low stress and the followability to a mold may significantly differ in the longitudinal and transverse directions, so that the finishing form of a molded article may be worsened in some cases. If the ratio exceeds 14, tears due to elongation deformation in the transverse direction may also be formed in some cases.

At the time of thermal bonding of the filament nonwoven fabric at 140 to 215° C. by embossing rolls, the linear pressure is preferably 10 to 80 kN/m and more preferably 30 to 70 kN/m.

If the temperature in the embossing process is made high to avoid the dry heat shrinkage rate to be high, it becomes difficult for the fibers to be interlaced and bonded in the interlacing step for the dense layer and the bulky layer and the tear strength of the nonwoven fabric for reinforcement becomes low and therefore, the durability of a foam molded article may sometimes be inferior. If the linear pressure of the embossing rolls is less than 10 kN/m, the press bonding may be uneven and if the linear pressure exceeds 80 kN/m, it becomes difficult for the fibers to be interlaced and bonded in the interlacing step for the dense layer and the bulky layer and the tear strength of the nonwoven fabric for reinforcement becomes low and therefore, the durability of a foam molded article may sometimes be inferior.

The interlacing method for the dense layer and the bulky layer in the present invention is not particularly limited but it is preferable to carry out the interlacing treatment by needle-punching for forming a preferable extruded fiber structure in the surface of the dense layer. In the above-mentioned interlacing treatment by needle punching, it is preferable that the needle density is 30 to 300 needles/cm$^2$ to form a preferable extruded fiber structure. Further, the degree of the extruded fiber structure formation by needle punching depends on the needle penetration state. The depth to which the first varve of needles penetrates the nonwoven fabric is preferably 9 to 12 mm. If the penetration depth is less than 9 mm, it becomes difficult to form a preferable extruded fiber structure and if the penetration depth exceeds 12 mm, the hole diameter becomes large and the foamable resin may possibly bleed out in the foam molding step.

The base weight of the filament nonwoven fabric to be used for the dense layer of the present invention is 20 g/m$^2$ or higher and preferably 30 g/m$^2$ or higher. Still more, the base weight is preferably 90 g/m$^2$ or lower, more preferably 80 g/m$^2$ or lower, and even more preferably 70 g/m$^2$ or lower. Thickness of the filament nonwoven fabric to be used for the dense layer of the present invention is preferably 0.2 mm or thicker, more preferably 0.3 mm or thicker, and even more preferably 0.4 mm or thicker. Still more, thickness is preferably 1.0 mm or less, more preferably 0.9 mm or less, even more preferably 0.8 mm or less and most preferably 0.6 mm or less. If the tensile strength and tear strength are high even if the base weight is low, the function of shutting the foamable resin is remarkably improved at the time of foam molding.

Further, the dense layer is preferable to have an extruded fiber structure formed by interlacing and bonding fibers composing the filament nonwoven fabric, which forms the bulky layer, in the foamed body face side. Owing to the extruded fiber structure, the filament nonwoven fabric itself is made soft by carrying out the interlacing treatment while keeping the function of shutting a foamable resin, so that the nonwoven fabric for reinforcement can be provided with followability to a mold that is an evenly deformable property. Still more, the anchor effect for firmly uniting the nonwoven fabric for reinforcement and a foamed body can be caused by embedding the extruded fiber structure in the foamed body.

In terms of improvement of the durability of a foam molded article, the nonwoven fabric for reinforcement of the second aspect of the present invention is required to have higher than 0.15 g/cm$^3$ apparent density of the dense layer and the bulky layer and the apparent density of the dense layer is preferably 0.16 to 0.18 g/cm$^3$ and the apparent density of the bulky layer is preferably 0.155 to 0.165 g/cm$^3$. If the apparent density of the dense layer and the bulky layer is too high, it becomes difficult for the fibers to be interlaced in the interlacing step for the dense layer and the bulky layer and it may result in failure to obtain a desired tear strength in some cases.

Since required to have a function as a shutting layer for shutting leakage of a foamable resin to the surface of the nonwoven fabric for reinforcement at the time of foam molding, the filament nonwoven fabric of the dense layer is preferable to have independent dot-like partially press-bonded parts. After the interlacing treatment of the dense layer and the bulky layer, the dense layer is also softened. That is useful for reliably retaining followability to a mold at the time of a molding process, keeping gas leakage at the time of foaming, and preventing blisters of a molded article. Formation of independent dot-like partially press-bonded parts in the filament nonwoven fabric of the dense layer can cause a structure fixation effect; that is, the independent press-bonded fiber assembly parts work as bonding points for firmly fixing the constituent long fibers. The parts made flat other than the dot-like partially press-bonded parts provide the dense layer with a shutting layer effect. As a result, the dense layer has a proper air permeability and also has a function of easily following deformation by foam molding and a degassing function.

If no press-bonding treatment is carried out for the filament nonwoven fabric of the dense layer, the tear strength is lowered because of lowering of the nonwoven fabric strength and at the same time, the function of shutting a foamable resin is lowered and the foamable resin may bleed out in the foam molding step in some cases.

In the case where the press-bonding treatment is carried out for the entire surface of the filament nonwoven fabric, even if the dense layer is softened by the interlacing treatment, the deformability at the time of foam molding becomes inferior and the air permeability is lowered and a foam molded article may float in a mold in the foam molding step in some cases. Further, if the press-bonded parts are successively continued, the flexibility is worsened so that deformation may become difficult in the foam molding step.

The surface area ratio of the partially press-bonded parts in the filament nonwoven fabric of the dense layer is not particularly limited, but it is preferably 5 to 40%, more preferably 8 to 25%, and even more preferably 10 to 20%. If it is less than 5%, the mechanical characteristic may be lowered in some cases. Further, the shutting function for a foamable resin becomes insufficient and bleeding of the foamable resin may be caused in some cases. If it exceeds 40%, the followability to a mold may possibly become inferior in some cases.

A method for forming independent partially press-bonded parts in the filament nonwoven fabric is not particularly limited. In the present invention, a conventional method, for example, embossing roller processing may be employed. The form of the partially press-bonded parts is also not particularly limited if they are independent dots and examples may be weave patterns, diamond patterns, square patterns, hexagonal patterns, oval patterns, check patterns, polka-dot patterns, round patterns, etc.

It is preferable that an extruded fiber structure is formed in the face of the dense layer bringing into contact with a foamed body. Still more, the anchor effect for bonding and firmly uniting the foamed body and the dense layer can be caused by embedding the extruded fiber structure in the foamed body. In the case where no extruded fiber structure is formed in the face of the dense layer bringing into contact with the foamed body, the bonding force of the foamed body and the dense layer becomes insufficient and it is possible that the foamed body and the nonwoven fabric for reinforcement are easily separated from each other.

The base weight and the thickness of the filament nonwoven fabric to be used for the dense layer and the bulky layer are not particularly limited. The base weight is preferably 20 to 90 g/m$^2$, more preferably 20 to 80 g/m$^2$, and even more preferably 30 to 70 g/m$^2$. Thickness is preferably 0.3 to 1.0 mm and preferably 0.4 to 0.9 mm.

Air permeability of the nonwoven fabric for reinforcement of the first aspect of the present invention is 50 to 250 cm$^3$/cm$^2$·sec and preferably 75 to 200 cm$^3$/cm$^2$·sec. If the air permeability is less than 50 cm$^3$/cm$^2$·sec, the expanded air discharge degree at the time of foam molding become uneven and it may results in defects, resin removal, or the like in some cases. If it exceeds 250 cm$^3$/cm$^2$·sec, bleeding because of foamable resin leakage may occurs in some cases.

The fineness of long fibers to be used for the dense layer and the bulky layer is not particularly limited, but in terms of exhibition of the foamable resin shutting function, the reinforcing function, and the cushion function of the filament nonwoven fabric, it is preferable to be 1.0 to 6 dtex and more preferable to be 1.5 to 4 dtex.

In terms of improvement of durability of a foam molded article, tear strength of the nonwoven fabric for reinforcement of the second aspect of the present invention in both longitudinal and transverse directions is required to be 20 N or higher and preferably 30 N or higher. However, if the tear strength is too high, it is sometimes impossible to obtain desired stress at the time of 5% elongation.

In terms of suppression of wrinkle formation in the foam molding step, dry heat shrinkage rate at the time of heat treatment at 80° C. for 30 minutes of the nonwoven fabric for reinforcement of the second aspect of the present invention is required to be −1 to 2% and preferably −0.5 to 0.5% in both longitudinal and transverse directions. If the dry heat shrinkage rate is too low, not only wrinkles tend to be formed easily, but also flexibility is worsened and deformation may become difficult in the foam molding step. If the dry heat shrinkage rate is too high, not only wrinkles tend to be formed easily, but also a foam molded article may sometimes float in a mold in the foam molding step.

The nonwoven fabric for reinforcement of the present invention is preferable to have a double layer structure composed of a dense layer and a bulky layer and may additionally have a middle layer unitedly formed between the dense layer and the bulky layer and a nonwoven fabric to be used for the middle layer is not particularly limited. The middle layer may be used as a shutting layer.

Materials for the filament nonwoven fabric to be used for the dense layer and the bulky layer of the present invention are not particularly limited, but filament nonwoven fabrics made of polyester type resins with a high function of shutting a foamable resin and good followability to a mold are preferable.

Examples of the polyester type resins may include homopolyesters such as poly(ethylene terephthalate) (PET), poly(butylene terephthalate) (PBT), poly(butylene naphthalate) (PBN), poly(cyclohexanedimethyl terephthalate) (PCHT), poly(propylene terephthalate) (PTT), etc., and their copolymers and mixtures.

In the case where a temperature for foam molding of a foamed body is made low, if poly(ethylene naphthalate) or polycarbonate having glass transition temperature exceeding 100° C. is used as the materials for the filament nonwoven fabric, the followability to a mold at the time of foam molding may become inferior in some cases. Therefore, in the case where, for example, a foamable polyurethane is processed by foam molding at low temperature, polyester resins with melting point of 220° C. or higher and glass transition temperature of less than 80° C. are preferable.

Examples of such polyester type resins may be homopolyesters such as poly(ethylene terephthalate) (PET), poly(butylene terephthalate) (PBT), poly(butylene naphthalate) (PBN), poly(propylene terephthalate) (PTT), etc., and their copolymers and mixtures. The polyester resins are preferably polyester resins with glass transition temperature of 70° C. or lower. Most desirable polyester resins are poly(ethylene terephthalate) (PET) and copolymers containing ethylene terephthalate as a main constituent units.

If necessary, a reforming agent such as an antioxidant, a light-proof agent, a coloring agent, an antibacterial agent, a flame retardant, a hydrophilizing agent, etc. may be added to an extent that the characteristics of the nonwoven fabric for reinforcement are not deteriorated.

A nonwoven fabric for reinforcement satisfying the above-mentioned requirements of the present invention is cut in a prescribed form and set in a molding due for cushions as a reinforcing cloth for foam molded articles in a manner that the face of the extruded fiber structure is in the foamable resin side (that is, the dense layer is in the foamable resin side of a foam molded article) and thereafter foamed to obtain a foam molded article made of urethane foam. A cold foam molding method or a hot foam molding method may be employed as the foam molding method. The foam molded article is formed in a good finishing form, free from bleeding of the foamable resin, excellent in shape retention durability and wear resistance and, as a spring receiving material, capable of suppressing frictional sound, flexural sound, and reflection sound. The operationability in the cutting step into a prescribed form and for setting on a mold is remarkably good without deformation of the nonwoven fabric.

The nonwoven fabric for reinforcement of the present invention can be used for various kinds of interior materials for vehicles and also construction materials, surface-foamed molded articles for electronic products as a nonwoven fabric for reinforcement, but not limited for cushions of seats of vehicles.

The present application claims the benefit of the priority date of Japanese patent application No. 2012-127510 filed on Jun. 4, 2012 and No. 2012-127511 filed on Jun. 4, 2012. All of the contents of the Japanese patent application No. 2012-127510 filed on Jun. 4, 2012 and No. 2012-127511 filed on Jun. 4, 2012, are incorporated by reference.

EXAMPLES

Hereinafter, the present invention will be described more in detail with reference to Examples and Comparative Examples, but the present invention should not be limited to these Examples.

Evaluation methods employed for Examples of the present invention and Comparative Examples are as follows.

(1) Fineness [dtex]

Arbitrary 5 points in one face and the other face of each layer were selected and single fiber diameter of 20 single fibers (n=20) was measured by an optical microscope and the average value was defined as an average single fiber diameter (D).

Fibers at the same 5 points were taken out and using a gradient density tube, the specific gravity of the fibers (n=5) was measured and the average value was defined as average specific gravity (ρ). Next, the average single fiber cross sectional surface area was calculated from the average single fiber diameter and fiber weight per 10000 m was calculated from the calculated value and the average specific gravity and defined as fineness (dtex). In addition, at the time of fiber diameter measurement, if the fiber diameter of hollow fibers or the like was difficult to be determined, it was measured from the fiber cross section of a SEM photograph.

(2) Base Weight [g/m$^2$]

Measurement was carried out according to "Weight per unit surface area" in JIS L1913:2010.

(3) Thickness [mm]

Thickness was measured at a load of 20 gf/cm$^2$ according to "Thickness" in JIS L1913:2010.

(4) Apparent Density [g/cm$^3$]

The apparent density was calculated from the base weight measured in the foregoing (2) and the thickness measured in the foregoing (3) according to the following equation.

Apparent density=Base weight÷(thickness×1000)

(5) Mechanical Characteristic of Nonwoven Fabric

According to "Tensile strength and elongation" in JIS L1913 6.3: 2010, specimens at arbitrary 5 points were cut out in standard atmosphere (22° C.) and a elongation load curve until rupture was measured for the respective specimens (n=5) and the over-all average of respective values was calculated.

(5-1) Stress at the Time of 5% Elongation [N/5 cm]

The stress [N/5 cm] at the time of 5% elongation at 22° C. was defined as the stress at the time of 5% elongation.

(6) Air Permeability (cm$^3$/cm$^2$ sec)

Air permeability was measured by a Frazier air permeability measurement apparatus according to JIS L1913 6.8.1: 2010.

(7) Judgement of Nonwoven Fabric

Whether a coating layer was a short fiber-nonwoven fabric or not was determined by pulling out composing fibers and confirming that the fibers in short fiber state by eye observation. Whether a dense layer was of a filament nonwoven fabric or not was determined by peeling an interlaced other fiber-nonwoven fabric layer (including the extruded fiber structure part) and confirming that the dense layer was composed of long fibers by eye observation.

(8) Surface Area Ratio of Partially Press-Bonded Parts of Filament Nonwoven Fabric The filament nonwoven fabric of the dense layer was separated from the filament nonwoven fabric (including the extruded fiber structure part) of the bulky layer to obtain a specimen and cut in a 30 mm square at arbitrary 20 points and photographed in 50 times magnification by a SEM. The obtained photograph was printed in an A3 size and the press-bonded unit surface area was cut off to measure the surface area (S0). Next, only a press-bonded part was cut out in the press-bonded unit surface area and the press bonded dot surface area (Si [mm$^2$]) of each press-bonded part was measured and the average value was determined to be the press-bonded dot surface area of the partially press-bonded part. The surface area ratio (P [%]) of partially press-bonded parts was calculated from the integrated value of press-bonded surface areas (ΣSi=Sp) according to the following equation.

$$P=Sp/S0 (n=20)$$

(9) Drawing Deformation of Nonwoven Fabric

Using a nonwoven fabric with width of 5 cm according to "Tensile strength and elongation" in JIS L19136.3: 2010, elongation recovery treatment with elongation stress of 20 N/5 cm in the longitudinal direction was carried out 10 times and each specimen was left for 1 hour and the elongation deformation of the nonwoven fabric in the longitudinal direction and state change by eye observation were measured.

In the case elongation deformation was less than 5% (no state change): ○; in the case where elongation deformation was 5% or higher and less than 10% (state change was slight): Δ; and in the case where elongation deformation was 10% or higher (state change occurred): x.

(10) Foam Moldability

A nonwoven fabric for reinforcement which was cut in prescribed form was set in a cushion pad mold in a manner of adapting the nonwoven fabric for reinforcement to adapt to the form of the mold and the setting state was evaluated as followability to a mold by function evaluation. Next, 2-liquid type urethane resins (isocyanate: San Foam (registered trade name) RC-1026, manufactured by Sanyo Chemical Industries, Ltd./polyol San Foam (registered trade name) IC-505N, manufactured by Sanyo Chemical Industries, Ltd.=1/2.5 (weight ratio) were subjected to cold foaming (foam volume: width 460 mm×length 380 mm×depth 50 mm) at 65° C. and each molded article was evaluated by eye observation.

(10-1) Followability to a Mold

Easy to adapting to the mold and to be set in the mold: ○; easy to get along with the mold but hard to be set in the mold: Δ; and hard to adapting to the mold and to be set in the mold: x and those marked with ○ and Δ were determined to be practically applicable.

(10-2) Bleeding

Bleeding was evaluated by eye observation as follows: no bleeding of the urethane resins to the surface of a nonwoven fabric for reinforcement of a molded article: ○; slight bleeding: Δ; and apparently bleeding observed: x.

(10-3) Tearing

Tearing was evaluated by eye observation as follows: no tear in the face of the nonwoven fabric for reinforcement of a molded particle: ○, immediately before tearing: Δ; and tears observed: x.

(10-4) Property of Adapting to Mold

Eye observation was carried out as follows: the face of the nonwoven fabric for reinforcement of a molded article was conformed to the form of the mold: ○; slightly unmatched form: Δ; and apparently unmatched: x.

(10-5) Wrinkle

Evaluation was done as follows: no wrinkle formed in the face of the nonwoven fabric for reinforcement of a molded article: ○ and wrinkles were formed in the face of the nonwoven fabric for reinforcement of a molded article: x and those which were marked with ○ were determined to be practically applicable.

(11) Evaluation of Sound Suppression of Molded Article

A molded article (cushion pad) was set in an actual vehicle and the vibration sound and frictional sound were heard for 1 hour flat land driving test at 60 km/h and thus functional evaluation was carried out as follows: quiet as compared with the case where a molded article (cushion pad) having no nonwoven fabric for reinforcement: ○ and same quietness: x.

(12) Dry Heat Shrinkage Rate

Specimens were cut out at arbitrary 3 points and according to "Dry heat shrinkage rate" in JIS L 1913 6.3: 2010, and the specimens were heated in an oven at 80° C. (model: PHH-101, manufactured by Tabai Espec Corp.) for 30 min. while being held in no tension state. After the treatment, the shrinkage rate was measured and its average value was determined to be dry heat shrinkage rate.

(13) Tear Strength

Specimens were cut out at arbitrary 3 points in the longitudinal and transverse directions and measurement was carried out according to "Tear strength (single tongue method)" in JIS L 1913 6.3: 2010 and the average value was determined to be tear strength.

Example 1

Poly(ethylene terephthalate) (hereinafter, abbreviated as "PET") with intrinsic viscosity of 0.65 dl/g was melt-spun at spinning temperature of 290° C. and single hole discharge amount of 1.0 g/min out of a nozzle with a round cross section and opened while being pulled at a spinning speed of 4500 m/min and dropped on a conveyor belt below. Baffles for following current having 2 cm height and made of a punching metal were installed in the rim parts in the width direction of the conveyor net and the suction blow speed was controlled to be 8 m/s to obtain a web with the base weight of 30 g/m$^2$ composed of long fibers with fineness of 2.2 dtex. Next, using embossing rollers having oval patterns and press-bonding surface area of 18%, an embossing process was carried out successively at embossing temperature of 200° C. and linear pressure of 40 kN/m to obtain a filament nonwoven fabric for dense layers made of continuous fibers with 2.2 dtex and having base weight of 30 g/m$^2$, fiber arrangement angle of 22°, and apparent density of 0.185 g/cm$^3$.

PET with intrinsic viscosity of 0.65 dl/g was melt-spun at spinning temperature of 290° C. and single hole discharge amount of 1.0 g/min out of a nozzle with a round cross section and opened while being pulled at a spinning speed of 4500 m/min and dropped on a conveyor belt below. At that time, the suction blow speed was controlled to be 12 m/s to obtain a web with base weight of 30 g/m$^2$ composed of long fibers with fineness of 2.2 dtex. Next, using embossing rollers having oval patterns and press-bonding surface area of 18%, an embossing process was carried out successively at embossing temperature of 150° C. and linear pressure of 30 kN/m to obtain a filament nonwoven fabric for bulky layers made of continuous fibers with 2.2 dtex and having base weight of 30 g/m$^2$, fiber arrangement angle of 45°, and apparent density of 0.146 g/cm$^3$.

The above-mentioned filament nonwoven fabric for dense layers and filament nonwoven fabric for bulky layers were subjected to interlacing treatment by needle punch in a manner that needles could penetrate the filament nonwoven fabric for bulky layers and the filament nonwoven fabric for dense layers successively in this order with 50 penetrations/cm$^2$ and needle depth of 10 mm to obtain a layered and interlaced nonwoven fabric for reinforcement with base weight of 60 g/m$^2$.

The obtained nonwoven fabric for reinforcement was found which has thickness of 0.62 mm, stress of 25 N/5 cm in the longitudinal direction and of 10 N/5 cm in the transverse direction, longitudinal-transverse ratio (hereinafter, referred to as longitudinal/transverse ratio) at the time of 5% elongation of 2.50, and air permeability of 200 cm$^3$/cm$^2$·sec.

The evaluation results of the obtained nonwoven fabrics for reinforcement are shown in Table 1. Example 1 satisfying the requirements of the present invention was found excellent in the drawing deformation and the followability to a mold, free from bleeding and tears in the foam molding, and also excellent in the property of adapting to a mold. In the functional evaluations, the sound suppressing property was good and thus Example 1 was a nonwoven fabric having excellent capacity for reinforcement of foam molded articles.

Example 2

PET with intrinsic viscosity of 0.65 dl/g was melt-spun at spinning temperature of 290° C. and single hole discharge amount of 1.0 g/min out of a nozzle with a round cross section and opened while being pulled at a spinning speed of 4500 m/min and dropped on a conveyor belt below. Baffles for following current having 2 cm height and made of a punching metal were installed in the rim parts in the width direction of the conveyor net and the suction blow speed was controlled to be 6 m/s to obtain a web with the base weight of 40 g/m$^2$ composed of long fibers with fineness of 2.2 dtex. Next, using embossing rollers having oval patterns and press-bonding surface area of 18%, an embossing process was carried out successively at embossing temperature of 200° C. and linear pressure of 40 kN/m to obtain a filament nonwoven fabric for dense layers made of continuous fibers with 2.2 dtex and having base weight of 40 g/m$^2$, fiber arrangement angle of 26°, and apparent density of 0.182 g/cm$^3$.

A filament nonwoven fabric for bulky layers with fiber arrangement angle of 48° and apparent density of 0.143 g/cm$^3$ was obtained in the same manner as that in Example 1, except that the conveyor speed was so changed as to give base weight of 40 g/m$^2$ to the filament nonwoven fabric for bulky layers.

Thereafter, the interlacing treatment by needle punch was carried out similarly to that in Example 1 to obtain a layered and interlaced nonwoven fabric for reinforcement with base weight of 80 g/m$^2$. The obtained nonwoven fabric for reinforcement was found which has thickness of 0.85 mm, stress of 32 N/5 cm in the longitudinal direction and of 13 N/5 cm in the transverse direction, longitudinal/transverse ratio of 2.46 at the time of 5% elongation, and air permeability of 160 cm$^3$/cm$^2$·sec.

The evaluation results of the obtained nonwoven fabrics for reinforcement are shown in Table 1. Example 2 satisfying the requirements of the present invention was found excellent in the drawing deformation and the followability to a mold, free from bleeding and tears in the foam molding, and also excellent in the property of adapting to a mold. In the functional evaluations, the sound suppressing property was good and thus Example 2 was a nonwoven fabric having excellent capacity for reinforcement of foam molded articles.

Example 3

PET with intrinsic viscosity of 0.65 dl/g was melt-spun at spinning temperature of 290° C. and single hole discharge amount of 1.0 g/min out of a nozzle with a round cross section and opened while being pulled at a spinning speed of 4500 m/min and dropped on a conveyor belt below. Baffles for following current having 2 cm height and made of a punching metal were installed in the rim parts in the width direction of the conveyor net and the suction blow speed was controlled to be 6 m/s to obtain a web with the base weight of 65 g/m$^2$ composed of long fibers with fineness of 2.2 dtex. Next, using embossing rollers having oval patterns and press-bonding surface area of 18%, an embossing process was carried out successively at embossing temperature of 150° C. and linear pressure of 30 kN/m to obtain a filament nonwoven fabric for bulky layers made of continuous fibers with 2.2 dtex and having base weight of 65 g/m$^2$, fiber arrangement angle of 28°, and apparent density of 0.151 g/cm$^3$.

Thereafter, the above-mentioned filament nonwoven fabric for bulky layers and 40 g/m$^2$ of a filament nonwoven fabric for dense layers obtained in the same manner as that in Example 2 were subjected to interlacing treatment by needle punch in the same manner as that in Example 1 to obtain a layered and interlaced nonwoven fabric for reinforcement with base weight of 105 g/m$^2$. The obtained nonwoven fabric for reinforcement was found which has thickness of 1.10 mm, stress of 42 N/5 cm in the longitudinal direction and of 14 N/5 cm in the transverse direction, longitudinal/transverse ratio of 3.00 at the time of 5% elongation, and air permeability of 120 cm$^3$/cm$^2$·sec.

The evaluation results of the obtained nonwoven fabrics for reinforcement are shown in Table 1. Example 3 satisfying the requirements of the present invention was found excellent in the drawing deformation and the followability to a mold, free from bleeding and tears in the foam molding, and also excellent in the property of adapting to a mold. In the functional evaluations, the sound suppressing property was good and thus Example 3 was a nonwoven fabric having excellent capacity for reinforcement of foam molded articles.

Example 4

PET with intrinsic viscosity of 0.65 dl/g was melt-spun at spinning temperature of 290° C. and single hole discharge amount of 1.0 g/min out of a nozzle with a round cross section and opened while being pulled at a spinning speed of 4500 m/min and dropped on a conveyor belt below. Baffles for following current having 2 cm height and made of a punching metal were installed in the rim parts in the width direction of the conveyor net and the suction blow speed was controlled to be 4.5 m/s to obtain a web with the base weight of 40 g/m$^2$ composed of long fibers with fineness of 2.2 dtex. Next, using embossing rollers having oval patterns and press-bonding surface area of 18%, an embossing process was carried out successively at embossing temperature of 200° C. and linear pressure of 40 kN/m to obtain a filament nonwoven fabric for dense layers made of continuous fibers with 2.2 dtex and having base weight of 40 g/m$^2$, fiber arrangement angle of 20°, and apparent density of 0.189 g/cm$^3$.

Thereafter, the above-mentioned filament nonwoven fabric for dense layers and 40 g/m$^2$ of a filament nonwoven fabric for bulky layers obtained in the same manner as that in Example 2 were subjected to interlacing treatment by needle punch in the same manner as that in Example 1 to obtain a layered and interlaced nonwoven fabric for reinforcement with base weight of 80 g/m$^2$. The obtained nonwoven fabric for reinforcement was found which has thickness of 0.84 mm, stress of 37 N/5 cm in the longitudinal direction and of 8 N/5 cm in the transverse direction, longitudinal/transverse ratio of 4.63 at the time of 5% elongation, and air permeability of 160 cm$^3$/cm$^2$·sec.

The evaluation results of the obtained nonwoven fabrics for reinforcement are shown in Table 1. Example 4 satisfying the requirements of the present invention was found excellent in the drawing deformation and the followability to a mold, free from bleeding and tears in the foam molding, and also excellent in the property of adapting to a mold. In the functional evaluations, the sound suppressing property was good and thus Example 4 was a nonwoven fabric having excellent capacity for reinforcement of foam molded articles.

Comparative Example 1

PET with intrinsic viscosity of 0.65 dl/g was melt-spun at spinning temperature of 290° C. and single hole discharge amount of 1.0 g/min out of a nozzle with a round cross section and opened while being pulled at a spinning speed of 4500 m/min and dropped on a conveyor belt below. At that time, the suction blow speed was controlled to be 12 m/s to obtain a web with base weight of 40 g/m$^2$ composed of long fibers with fineness of 2.2 dtex. Next, using embossing rollers having oval patterns and press-bonding surface area of 18%, an embossing process was carried out successively at embossing temperature of 200° C. and linear pressure of 40 kN/m to obtain a filament nonwoven fabric for dense layers made of continuous fibers with 2.2 dtex and having base weight of 40 g/m$^2$, fiber arrangement angle of 45°, and apparent density of 0.182 g/cm$^3$.

PET with intrinsic viscosity of 0.65 dl/g was melt-spun at spinning temperature of 290° C. and single hole discharge amount of 1.0 g/min out of a nozzle with a round cross section and opened while being pulled at a spinning speed of 4500 m/min and dropped on a conveyor belt below. At that time, the suction blow speed was controlled to be 12 m/s to obtain a web with base weight of 55 g/m$^2$ composed of long fibers with fineness of 2.2 dtex. Next, using embossing rollers having oval patterns and press-bonding surface area of 18%, an embossing process was carried out successively at embossing temperature of 170° C. and linear pressure of 30 kN/m to obtain a filament nonwoven fabric for bulky layers made of continuous fibers with 2.2 dtex and having base weight of 55 g/m$^2$, fiber arrangement angle of 49°, and apparent density of 0.152 g/cm$^3$.

Thereafter, the interlacing treatment by needle punch was carried out similarly to that in Example 1 to obtain a layered and interlaced nonwoven fabric for reinforcement with base weight of 95 g/m$^2$. The obtained nonwoven fabric for reinforcement was found which has thickness of 0.97 mm, stress of 20 N/5 cm in the longitudinal direction and of 13

N/5 cm in the transverse direction, longitudinal/transverse ratio of 1.54 at the time of 5% elongation, and air permeability of 135 cm$^3$/cm$^2$·sec.

The evaluation results of the obtained nonwoven fabrics for reinforcement are shown in Table 1. Comparative Example 1 with stress of 20 N/5 cm at the time of 5% elongation in the longitudinal direction was a nonwoven fabric which had a wider width at the time of drawing and could not be taken out in a prescribed size.

Comparative Example 2

PET with intrinsic viscosity of 0.65 dl/g was melt-spun at spinning temperature of 290° C. and single hole discharge amount of 1.0 g/min out of a nozzle with a round cross section and opened while being pulled at a spinning speed of 4500 m/min and dropped on a conveyor belt below. At that time, the suction blow speed was controlled to be 12 m/s to obtain a web with base weight of 65 g/m$^2$ composed of long fibers with fineness of 2.2 dtex. Next, using embossing rollers having oval patterns and press-bonding surface area of 18%, an embossing process was carried out successively at embossing temperature of 150° C. and linear pressure of 30 kN/m to obtain a filament nonwoven fabric for bulky layers made of continuous fibers with 2.2 dtex and having base weight of 65 g/m$^2$, fiber arrangement angle of 50°, and apparent density of 0.151 g/cm$^3$.

Thereafter, the above-mentioned filament nonwoven fabric for bulky layers and 40 g/m$^2$ of a filament nonwoven fabric for dense layers obtained in the same manner as that in Comparative Example 1 were subjected to interlacing treatment by needle punch in the same manner as that in Example 1 to obtain a layered and interlaced nonwoven fabric for reinforcement with base weight of 105 g/m$^2$. The obtained nonwoven fabric for reinforcement was found which has thickness of 1.10 mm, stress of 25 N/5 cm in the longitudinal direction and of 17 N/5 cm in the transverse direction, longitudinal/transverse ratio of 1.47 at the time of 5% elongation, and air permeability of 122 cm$^3$/cm$^2$·sec.

The evaluation results of the obtained nonwoven fabrics for reinforcement are shown in Table 1. Although being good in both drawing deformation and followability to a mold, Comparative Example 2 with stress of 17 N/5 cm at the time of 5% elongation in the transverse direction was a nonwoven fabric which had high stress in the transverse direction and was slightly inferior in the property of adapting to a mold and was thus problematic.

Comparative Example 3

PET with intrinsic viscosity of 0.65 dl/g was melt-spun at spinning temperature of 290° C. and single hole discharge amount of 1.0 g/min out of a nozzle with a round cross section and opened while being pulled at a spinning speed of 4500 m/min and dropped on a conveyor belt below. At that time, the suction blow speed was controlled to be 12 m/s to obtain a web with base weight of 30 g/m$^2$ composed of long fibers with fineness of 2.2 dtex. Next, using embossing rollers having oval patterns and press-bonding surface area of 18%, an embossing process was carried out successively at embossing temperature of 200° C. and linear pressure of 40 kN/m to obtain a filament nonwoven fabric for dense layers made of continuous fibers with 2.2 dtex and having base weight of 30 g/m$^2$, fiber arrangement angle of 45°, and apparent density of 0.185 g/cm$^3$.

Thereafter, the above-mentioned filament nonwoven fabric for dense layers and 30 g/m$^2$ of a filament nonwoven fabric for bulky layers obtained in the same manner as that in Example 1 were subjected to interlacing treatment by needle punch in the same manner as that in Example 1 to obtain a layered and interlaced nonwoven fabric for reinforcement with base weight of 60 g/m$^2$. The obtained nonwoven fabric for reinforcement was found which has thickness of 0.62 mm, stress of 18 N/5 cm in the longitudinal direction and of 13 N/5 cm in the transverse direction, longitudinal/transverse ratio of 1.38 at the time of 5% elongation, and air permeability of 204 cm$^3$/cm$^2$·sec.

The evaluation results of the obtained nonwoven fabrics for reinforcement are shown in Table 1. Comparative Example 3 with stress of 18 N/5 cm at the time of 5% elongation in the longitudinal direction was a nonwoven fabric which had a wider width at the time of drawing and could not be taken out in a prescribed size.

Comparative Example 4

PET with intrinsic viscosity of 0.65 dl/g was melt-spun at spinning temperature of 290° C. and single hole discharge amount of 2.0 g/min out of a nozzle with a round cross section and opened while being pulled at a spinning speed of 4500 m/min and dropped on a conveyor belt below. Baffles for following current having 2 cm height and made of a punching metal were installed in the rim parts in the width direction of the conveyor net and the suction blow speed was controlled to be 8 m/s to obtain a web with the base weight of 30 g/m$^2$ composed of long fibers with fineness of 4.4 dtex. Next, using embossing rollers having oval patterns and press-bonding surface area of 18%, an embossing process was carried out successively at embossing temperature of 200° C. and linear pressure of 40 kN/m to obtain a filament nonwoven fabric for dense layers made of continuous fibers with 4.4 dtex and having base weight of 30 g/m$^2$, fiber arrangement angle of 20°, and apparent density of 0.178 g/cm$^3$.

PET with intrinsic viscosity of 0.65 dl/g was melt-spun at spinning temperature of 290° C. and single hole discharge amount of 2.0 g/min out of a nozzle with a round cross section and opened while being pulled at a spinning speed of 4500 m/min and dropped on a conveyor belt below. At that time, the suction blow speed was controlled to be 12 m/s to obtain a web with base weight of 30 g/m$^2$ composed of long fibers with fineness of 4.4 dtex. Next, using embossing rollers having oval patterns and press-bonding surface area of 18%, an embossing process was carried out successively at embossing temperature of 150° C. and linear pressure of 30 kN/m to obtain a filament nonwoven fabric for bulky layers made of continuous fibers with 4.4 dtex and having base weight of 30 g/m$^2$, fiber arrangement angle of 42°, and apparent density of 0.133 g/cm$^3$.

Thereafter, the interlacing treatment by needle punch was carried out similarly to that in Example 1 to obtain a layered and interlaced nonwoven fabric for reinforcement with base weight of 60 g/m$^2$. The obtained nonwoven fabric for reinforcement was found which has thickness of 0.66 mm, stress of 25 N/5 cm in the longitudinal direction and of 9 N/5 cm in the transverse direction, longitudinal/transverse ratio of 2.78 at the time of 5% elongation, and air permeability of 315 cm$^3$/cm$^2$·sec.

The evaluation results of the obtained nonwoven fabrics for reinforcement are shown in Table 1. Although being good in both drawing deformation and followability to a mold, Comparative Example 4 with air permeability of 315 cm³/cm²·sec caused bleeding of urethane in foam molding and was inferior in the sound suppressing property for a molded article.

The obtained filament nonwoven fabric for dense layers and filament nonwoven fabric for bulky layers were subjected to interlacing treatment by needle punch in a manner

TABLE 1

| | item | unit | Example 1 | Example 2 | Example 3 | Example 4 | Comparative Example 1 | Comparative Example 2 | Comparative Example 3 | Comparative Example 4 |
|---|---|---|---|---|---|---|---|---|---|---|
| dense layers | baffles for following current | — | install | install | install | install | not install | not install | not install | install |
| | suction blow speed | m/sec | 8 | 6 | 6 | 4.5 | 12 | 12 | 12 | 8 |
| | using nonwoven fabric | — | filament | filament | filament | filament | filament | filament | filament | filament |
| | base weight | g/m² | 30 | 40 | 40 | 40 | 40 | 40 | 30 | 30 |
| | apparent density | g/cm³ | 0.185 | 0.182 | 0.182 | 0.189 | 0.182 | 0.182 | 0.185 | 0.178 |
| | fineness | dtex | 2.2 | 2.2 | 2.2 | 2.2 | 2.2 | 2.2 | 2.2 | 4.4 |
| bulky layers | baffles for following current | — | not install | not install | install | not install | not install | not install | not install | not install |
| | suction blow speed | m/sec | 1.2 | 12 | 6 | 12 | 12 | 12 | 12 | 12 |
| | using nonwaven fabric | — | filament | filament | filament | filament | filament | filament | filament | filament |
| | base weight | g/m² | 30 | 40 | 65 | 40 | 55 | 65 | 30 | 30 |
| | apparent density | g/cm³ | 0.146 | 0.143 | 0.151 | 0.143 | 0.152 | 0.151 | 0.146 | 0.133 |
| | fineness | dtex | 2.2 | 2.2 | 2.2 | 2.2 | 2.2 | 2.2 | 2.2 | 4.4 |
| nonwoven fabric for reinforcement | total base weight | g/m² | 60 | 80 | 105 | 80 | 95 | 105 | 60 | 60 |
| | thickness | mm | 0.62 | 0.85 | 1.10 | 0.84 | 0.97 | 1.10 | 0.52 | 0.66 |
| | Stress at the time of 5% elongation longitudinal | N/5 cm | 25 | 32 | 42 | 37 | 20 | 25 | 18 | 25 |
| | Stress at the time of 5% elongation transverse | N/5 cm | 10 | 13 | 14 | 8 | 13 | 17 | 13 | 9 |
| | longitudinal-transverse ratio at the time of 5% elongation | — | 2.50 | 2.46 | 3.00 | 4.63 | 1.54 | 1.47 | 1.38 | 2.78 |
| | gas permeability | cm³/cm² · sec | 200 | 160 | 120 | 160 | 135 | 122 | 204 | 315 |
| process passing property (drawing deformation) | | — | ○ | ○ | ○ | ○ | Δ | ○ | Δ | ○ |
| Foam moldability | followability to a mold | — | ○ | ○ | ○ | ○ | x | ○ | x | ○ |
| | bleeding | — | ○ | ○ | ○ | ○ | ○ | ○ | ○ | Δ |
| | tearing | — | ○ | ○ | ○ | ○ | ○ | ○ | ○ | ○ |
| | property of adapting to mold | — | ○ | ○ | ○ | ○ | ○ | Δ | ○ | ○ |
| performance of molded article | sound suppression | — | ○ | ○ | ○ | ○ | ○ | ○ | ○ | x |

Example 5

PET with intrinsic viscosity of 0.65 dl/g was melt-spun at 290° C. and single hole discharge amount of 1.0 g/min out of a nozzle with a round cross section and opened while being pulled at a spinning speed of 4500 m/min and dropped on a suction net below. Baffles for following current having 2 cm height and made of a punching metal were installed in the rim parts in the width direction of the suction net and the suction blow speed was controlled to be 8.0 m/s to obtain a web composed of long fibers with fineness of 2.2 dtex. Next, using embossing rollers having oval patterns and press-bonding surface area of 18%, an embossing process was carried out at temperature of 200° C. and linear pressure of 40 kN/m to obtain a filament nonwoven fabric for dense layers with base weight of 40 g/m².

PET with intrinsic viscosity of 0.65 dl/g was melt-spun at spinning temperature of 290° C. and single hole discharge amount of 1.0 g/min out of a nozzle with a round cross section and opened while being pulled at a spinning speed of 4500 m/min and dropped on a suction net below. Baffles for following current having 2 cm height and made of a punching metal were installed in the rim parts in the width direction of the suction net and the suction blow speed was controlled to be 8.0 m/s to obtain a web composed of long fibers with fineness of 2.2 dtex. Next, using embossing rollers having oval patterns and press-bonding surface area of 18%, an embossing process was carried out at temperature of 180° C. and linear pressure of 40 kN/m to obtain a filament nonwoven fabric for bulky layers with base weight of 40 g/m².

that needles could penetrate the filament nonwoven fabric for bulky layers and the filament nonwoven fabric for dense layers successively in this order with 50 penetrations/cm² and needle depth of 10 mm to obtain a nonwoven fabric for reinforcement.

The physical properties of the filament nonwoven fabrics and the nonwoven fabrics for reinforcement and the foam molding property are shown in Table 2.

Example 6

A nonwoven fabric for reinforcement was obtained in the same manner as that in Example 5, except that the suction blow speed was changed to be 6.0 m/s in the condition for producing the filament nonwoven fabric for dense layers and bulky layers.

The physical properties of the filament nonwoven fabrics and the nonwoven fabrics for reinforcement and the foam molding property are shown in Table 2.

Example 7

A nonwoven fabric for reinforcement was obtained in the same manner as that in Example 5, except that the suction blow speed was changed to be 4.5 m/s in the condition for producing the filament nonwoven fabric for dense layers and bulky layers.

The physical properties of the filament nonwoven fabrics and the nonwoven fabrics for reinforcement and the foam molding property are shown in Table 2.

Example 8

A nonwoven fabric for reinforcement was obtained in the same manner as that in Example 6, except that the base weight of the filament nonwoven fabric for bulky layers is 60 g/m².

The physical properties of the filament nonwoven fabrics and the nonwoven fabrics for reinforcement and the foam molding property are shown in Table 2.

Example 9

A nonwoven fabric for reinforcement was obtained in the same manner as that in Example 6, except that the baffles for following current were taken out, and the suction blow speed was changed to be 12.0 m/s in the condition for producing the filament nonwoven fabric for bulky layers.

The physical properties of the filament nonwoven fabrics and the nonwoven fabrics for reinforcement and the foam molding property are shown in Table 2.

Example 10

A nonwoven fabric for reinforcement was obtained in the same manner as that in Example 5, except that the suction blow speed was changed to be 3.3 m/s, and the embossing process temperature was changed to be 210° C. in the condition for producing the filament nonwoven fabric for dense layers and the suction blow speed was changed to be 12.0 m/s in the condition for producing the filament nonwoven fabric for bulky layers.

The physical properties of the filament nonwoven fabrics and the nonwoven fabrics for reinforcement and the foam molding property are shown in Table 2.

Comparative Example 5

A nonwoven fabric for reinforcement was obtained in the same manner as that in Example 5, except that the baffles for following current were taken out, and the suction blow speed was changed to be 12.0 m/s in the condition for producing the filament nonwoven fabric for dense layers and bulky layers.

The physical properties of the filament nonwoven fabrics and the nonwoven fabrics for reinforcement and the foam molding property are shown in Table 2.

Comparative Example 6

A nonwoven fabric for reinforcement was obtained in the same manner as that in Example 5, except that the baffles for following current were taken out, the suction blow speed was changed to be 12.0 m/s, and the embossing process temperature was changed to be 220° C. in the condition for producing the filament nonwoven fabric for dense layers and the baffles for following current were taken out, the suction blow speed was changed to be 12.0 m/s, and the embossing process temperature was changed to be 200° C. in the condition for producing the filament nonwoven fabric for bulky layers.

The physical properties of the filament nonwoven fabrics and the nonwoven fabrics for reinforcement and the foam molding property are shown in Table 2.

From Table 2, it can be understood that the nonwoven fabrics for reinforcement of Examples 5 to 10 were excellent in the foam molding property and the nonwoven fabrics for reinforcement of Comparative Examples 5 and 6 were inferior in the foam molding property.

TABLE 2

| item | | | unit | Example 5 | Example 6 | Example 7 | Example 8 | Example 9 | Example 10 | Comparative Example 5 | Comparative Example 6 |
|---|---|---|---|---|---|---|---|---|---|---|---|
| dense layers | baffles for following current | | — | install | install | install | install | install | install | not install | not install |
| | suction blow speed | | m/sec | 8.0 | 6.0 | 4.5 | 6.0 | 6.0 | 3.3 | 12.0 | 12.0 |
| | embossing process | temperature | ° C. | 200 | 200 | 200 | 200 | 200 | 210 | 200 | 220 |
| | | linear pressure | kN/m | 40 | 40 | 40 | 40 | 40 | 40 | 40 | 40 |
| | base weight | | g/m² | 40 | 40 | 40 | 40 | 40 | 40 | 40 | 40 |
| | apparent density | | g/cm³ | 0.171 | 0.171 | 0.171 | 0.171 | 0.171 | 0.171 | 0.171 | 0.171 |
| bulky layers | baffles for following current | | — | install | install | install | install | not install | install | not install | not install |
| | suction blow speed | | m/sec | 8.0 | 6.0 | 4.5 | 6.0 | 12.0 | 12.0 | 12.0 | 12.0 |
| | embossing process | temperature | ° C. | 180 | 180 | 180 | 180 | 180 | 180 | 180 | 200 |
| | | linear pressure | kN/m | 40 | 40 | 40 | 40 | 40 | 40 | 40 | 40 |
| | base weight | | g/m² | 40 | 40 | 40 | 60 | 40 | 40 | 40 | 40 |
| | apparent density | | g/cm³ | 0.159 | 0.159 | 0.159 | 0.159 | 0.159 | 0.159 | 0.159 | 0.159 |
| nonwoven fabric for reinforcement | total bass weight | | g/m³ | 80 | 80 | 80 | 100 | 80 | 80 | 80 | 80 |
| | dry heat shrinkage rate | longitudinal | % | 0.1 | 0 | −0.02 | 0.35 | −0.02 | 0.35 | 2.2 | 0.2 |
| | | transverse | % | −0.01 | −0.01 | 0 | 0.2 | −0.05 | 0.2 | 0.7 | 0 |
| | tear strength | longitudinal | N | 41 | 38 | 37 | 57 | 36 | 29 | 41 | 18 |
| | | transverse | N | 35 | 36 | 36 | 55 | 35 | 35 | 30 | 14 |
| | stress at the time of 5% elongation | longitudinal | N/5 cm | 30 | 32 | 35 | 38 | 30 | 44 | 18 | 45 |
| | | transverse | N/5 cm | 12 | 10 | 8 | 15 | 16 | 10 | 10 | 20 |
| Foam moldability | followability to a mold | | — | ○ | ○ | ○ | ○ | Δ | Δ | ○ | ○ |
| | wrinkle | | — | ○ | ○ | ○ | ○ | ○ | ○ | x | ○ |
| | tearing | | — | ○ | ○ | ○ | ○ | ○ | ○ | ○ | x |

INDUSTRIAL APPLICABILITY

The nonwoven fabric for reinforcement of the present invention is particularly excellent in dimensional stability in the cutting/sewing step although flexible. The nonwoven fabric for reinforcement of the present invention is composed of a dense layer with shutting function of a high foamable resin and a bulky layer excellent in a sound suppression property and is excellent in a close adhesion property between a foam molded part and the nonwoven fabric for reinforcement because of the anchor effect attributed to an extruded fiber structure and is accordingly a nonwoven fabric optimum for application as reinforcing cloth for foam molding. Consequently, followability to a mold at the time of foam molding is excellent and a high grade foam molded article can be obtained without bleeding of a foamable resin. Further, the nonwoven fabric for reinforcement is excellent in a sound suppressing property to the frictional sound generated by friction between the foam molded article and springs and also excellent in a reinforcing effect and durability and is thus suitable for use as a reinforcing cloth to obtain highly functional foam molded articles at saved production cost.

Still further, since being relatively lightweight, the nonwoven fabric for reinforcement of the present invention is useful for economically producing a lightweight and high grade foam molded article and contributes to making a vehicular seat using the foam molded article economical and lightweight and also to saving energy in terms of driving the vehicle.

The invention claimed is:

1. A nonwoven fabric for reinforcing foam molded articles formed by interlacing at least 2 filament nonwoven fabric layers with different apparent density, wherein
the nonwoven fabric has base weight of 50-110 g/m², thickness of 0.5-1.2 mm, 23 to 50 N/5 cm stress at the time of 5% elongation at 22° C. in longitudinal direction, 15 N/5 cm or lower stress at the time of 5% elongation at 22° C. in transverse direction, and air permeability of 50 to 250 cm³/cm² sec,
the fiber arrangement angle of the filament nonwoven fabric layer with the highest apparent density is 5 to 60°,
and the ratio of the stress at the time of 5% elongation in the longitudinal direction and the stress at the time of 5% elongation in the transverse direction is 2.2 or higher.

2. The nonwoven fabric for reinforcing foam molded articles as claimed in claim 1, wherein the filament nonwoven fabric layers are made of polyester fibers.

3. A foam molded article, wherein the nonwoven fabric for reinforcing foam molded articles as claimed in claim 1 is used as a reinforcing cloth.

4. The foam molded article as claimed in claim 3, wherein the filament nonwoven fabric layer with higher apparent density between 2 layers of filament nonwoven fabric with different density is arranged in the foamed body side of the foam molded article.

5. The nonwoven fabric of claim 1, wherein the filament nonwoven fabric layer with the highest apparent density is made by using baffles to tilt fibers in the endless direction of a conveyor belt.

6. The nonwoven fabric of claim 1, wherein the ratio of the stress at the time of 5% elongation in the longitudinal direction and the stress at the time of 5% elongation in the transverse direction is 3 to 14.

7. The nonwoven fabric of claim 1, wherein the filament nonwoven fabric layers comprise polyethylene terephthalate.

8. The nonwoven fabric of claim 1, wherein the fiber arrangement angle of the filament nonwoven fabric layer with the highest apparent density is 5 to 30°.

* * * * *